United States Patent
Xiong et al.

(10) Patent No.: US 9,858,362 B2
(45) Date of Patent: Jan. 2, 2018

(54) METHOD OF LED FREEFORM SURFACE ILLUMINATION SYSTEM

(71) Applicants: Tsinghua University, Beijing (CN); HON HAI PRECISION INDUSTRY CO., LTD., New Taipei (TW)

(72) Inventors: Si-Si Xiong, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 467 days.

(21) Appl. No.: 14/604,353

(22) Filed: Jan. 23, 2015

(65) Prior Publication Data
US 2015/0234941 A1    Aug. 20, 2015

(30) Foreign Application Priority Data

Feb. 20, 2014   (CN) .......................... 2014 1 0057459

(51) Int. Cl.
| | |
|---|---|
| *G06F 7/60* | (2006.01) |
| *G06F 17/10* | (2006.01) |
| *G06F 17/50* | (2006.01) |
| *G06F 17/13* | (2006.01) |

(52) U.S. Cl.
CPC .............. *G06F 17/50* (2013.01); *G06F 17/13* (2013.01); *G06F 2217/16* (2013.01)

(58) Field of Classification Search
None
See application file for complete search history.

(56) References Cited

PUBLICATIONS

Bao, Zhi-Cong et al., "The Design of Freeform Surface Lens for LED Lighting System", 2013, International Symposium on Photoelectronic Detection and Imaging, Optical Storage and Display Technology, SPIE, vol. 8913.*

Zhenrong, Zhen et al., "Freeform Surface Lens for LED Uniform Illumination", Dec. 10, 2009, Applied Optics, vol. 48, No. 35, Optical Society of America.*

Lai, Junyuan et al., "Freeform LED Lens Design for Uniform Rectangular Illumination Using a New Source-Target Mapping", 2013, IEEE.*

Ding, Yi et al., "Freeform LED Lens for Uniform Illumination", Aug. 18, 2008, Optics Express, vol. 16, No. 17, Optical Society of America.*

(Continued)

*Primary Examiner* — Cedric D Johnson
(74) *Attorney, Agent, or Firm* — ScienBiziP, P.C.

(57) ABSTRACT

A design method of LED freeform surface illumination system is provided. A light emitting angle of a LED point light source is divided into three regions. Each region can form a rectangular light spot on a light receiving surface. A mapping relationship of each region on the receiving surface is obtained. A light redistribution design for the LED point light source is performed and a system of first order partial differential equations of a freeform surface is achieved. A system of first order quasi linear differential equations of the freeform surface is obtained. A plurality of freeform surface data is obtained by solving the system of first order quasi linear differential equations. The freeform surface is obtained by surface fitting the plurality of freeform surface data.

14 Claims, 12 Drawing Sheets

(56) References Cited

PUBLICATIONS

"The design of freeform surface lens for LED lighting system", Bao zhi-cong et al. Proc. of SPIE. vol. 8913.
"Design of freeform optical devices and their applications in illumination systems", Ding Yi. Chinese Doctoral Dissertations & Master's Theses Full-text Datebase(master) Engineering Technology.
"Optics in Solid State Lighting", Luo Yi et al. Acta Optica Sinica, vol. 31, No. 9, pp. 1-5.
"Simulation Design of Freeform Lens for Realizing Uniform Illumination of LED Table Lamp"; Zhuo Youwang et al.; Zhaoming Gongcheng Xuebao; vol. 22 No. 6; pp. 5-6.

\* cited by examiner

METHOD OF LED FREEFORM SURFACE ILLUMINATION SYSTEM

CROSS-REFERENCE TO RELATED APPLICATIONS

This application claims priority to Chinese Patent Application No. 201410057459.5, filed on Feb. 20, 2014, the disclosure of which is incorporated herein by reference.

FIELD

The present disclosure relates to a design method of LED freeform surface illumination system.

BACKGROUND

It is difficult to achieve a uniform illumination on a surface in a required area by LED which is commonly seen as a point light source. It is necessary to redistribute the LED light by a secondary optical design for a LED illumination system. Conventionally, a lens assembly is used in the LED illumination system to achieve the uniform illumination.

BRIEF DESCRIPTION OF THE DRAWINGS

Implementations of the present technology will now be described, by way of example only, with reference to the attached figures.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

Figure 1:
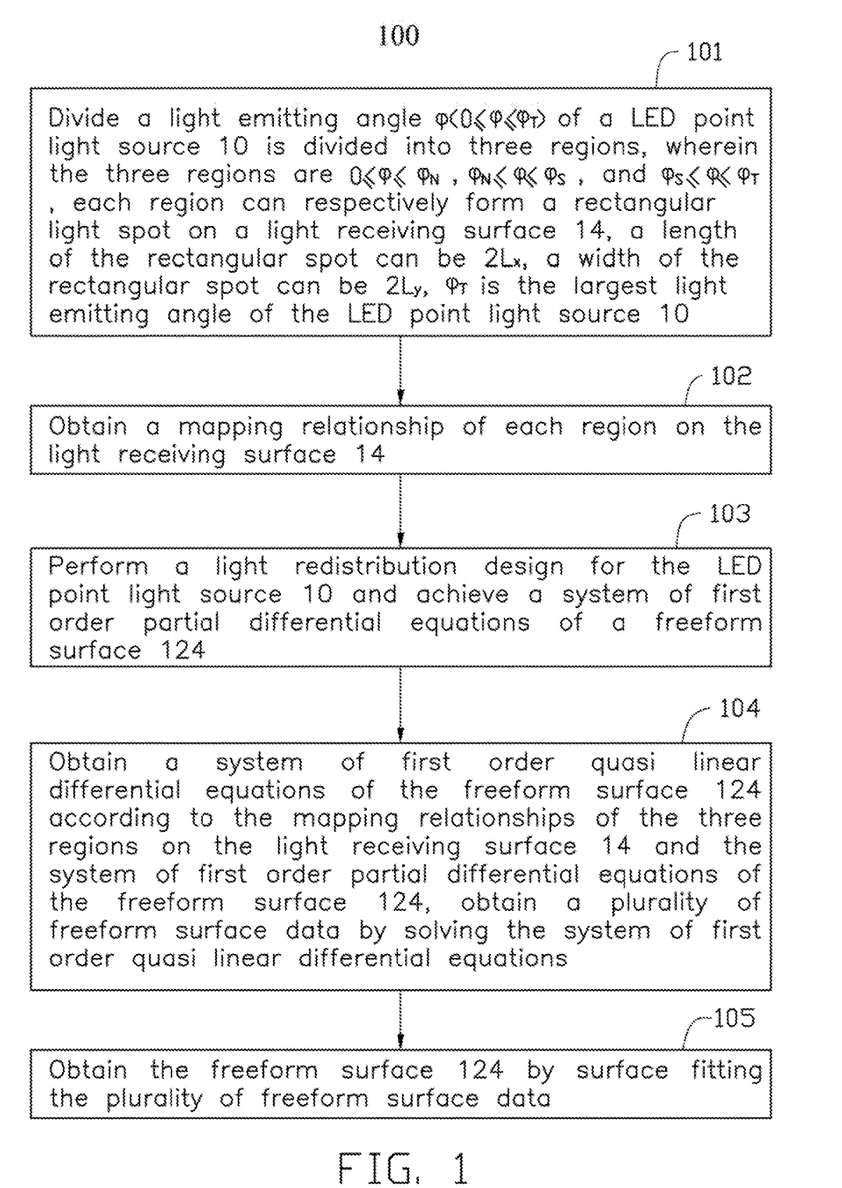
FIG. 1 is flowchart of one embodiment of a design method of LED freeform surface illumination system.

Referring to FIG. 1, a flowchart is presented in accordance with an example embodiment as illustrated. The embodiment of a design method of LED freeform surface illumination system 100 is provided by way of example, as there are a variety of ways to carry out the method. The method 100 described below can be carried out using the configurations illustrated in FIGS. 2 to 5 for example, and various elements of these figures are referenced in explaining example method 100. Each block shown in FIG. 1 represents one or more processes, methods, or subroutines carried out in the exemplary method 100. Additionally, the illustrated order of blocks is by example only and the order of the blocks can be changed. The exemplary method 100 can begin at block 101. Depending on the embodiment, additional steps can be added, others removed, and the ordering of the steps can be changed.

At block 101, a light emitting angle $\phi$ ($0 \leq \phi \leq \phi_T$) of a LED point light source 10 is divided into three regions. The three regions are $0 \leq \phi \leq \phi_N$, $\phi_N \leq \phi \leq \phi_S$, and $\phi_S \leq \phi \leq \phi_T$. Each region can respectively form a rectangular light spot on a light receiving surface 14. A length of the rectangular spot can be $2L_x$. A width of the rectangular spot can be $2L_y$. $\phi_T$ is the largest light emitting angle of the LED point light source 10.

At block 102, a mapping relationship of each region on the light receiving surface 14 is obtained.

At block 103, a light redistribution design for the LED point light source 10 is performed and a system of first order partial differential equations of a freeform surface 124 is achieved.

At block 104, a system of first order quasi linear differential equations of the freeform surface 124 is obtained according to the mapping relationships of the three regions on the light receiving surface 14 and the system of first order partial differential equations of the freeform surface 124. A plurality of freeform surface data is obtained by solving the system of first order quasi linear differential equations.

At block 105, the freeform surface 124 is obtained by surface fitting the plurality of freeform surface data.

Figure 2:
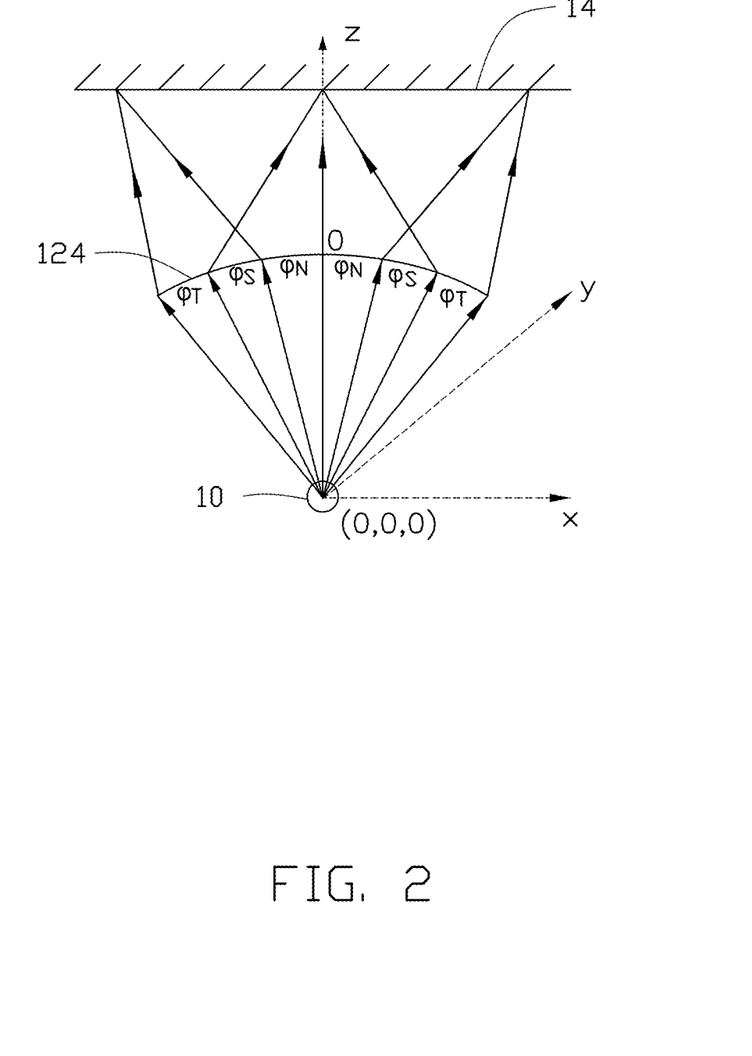
FIG. 2 is a schematic view showing one embodiment of divided regions of light emitting angles of a LED point light source and annular divided regions of a freeform surface in the design method of LED freeform surface illumination system.

Referring to FIG. 2, the largest light emitting angle $\phi_T$ of light emitted from the LED point light source 10 is not limited. In one embodiment, the largest light emitting angle $\phi_T$ is about 30°. The light emitting angle $\phi$ ($0 \le \phi \le \phi_T$) of the light emitted from the LED point light source 10 can be divided into three regions such as three equal regions, three equal proportional regions, or three arbitrary regions. Specifically, the three regions are $0 \le \phi \le \phi_N$, $\phi_N \le \phi \le \phi_S$, and $\phi_S \le \phi \le \phi_T$. In one embodiment, the light emitting angle $\phi$ ($0 \le \phi \le \phi_T$) of the light emitted from the LED point light source 10 is divided into three equal regions (e.g., $\phi_N = 10°$, $\phi_S = 20°$, and $\phi_T = 30°$).

In the region of the $0 \le \phi \le \phi_N$, the lights of $\phi = 0°$ passing the freeform surface 124 reach the center of the rectangular light spot on the light receiving surface 14. The lights of $\phi = \phi_N$ passing the freeform surface 124 reach the edges of the rectangular light spot on the light receiving surface 14. To keep the freeform surface 124 continuous, the lights at the junction between the region $0 \le \phi \le \phi_N$ and the region $\phi_N \le \phi \le \phi_S$ cannot have a sudden change. Thus, the lights of $\phi = \phi_N$ passing the freeform surface 124 reach the edges of the rectangular light spot on the light receiving surface 14, and the lights of $\phi = \phi_S$ passing the freeform surface 124 reach the center of the rectangular light spot on the light receiving surface 14. Similarly, to keep the freeform surface 124 continuous, the lights at the junction between the region $\phi_N \le \phi \le \phi_S$ and the region $\phi_S \le \phi \le \phi_T$ cannot have a sudden change. Thus, the lights of $\phi = \phi_S$ passing the freeform surface 124 reach the center of the rectangular light spot on the light receiving surface 14, and the lights of $\phi = \phi_T$ passing the freeform surface 124 reach the edges of the rectangular light spot on the light receiving surface 14.

Figure 3:
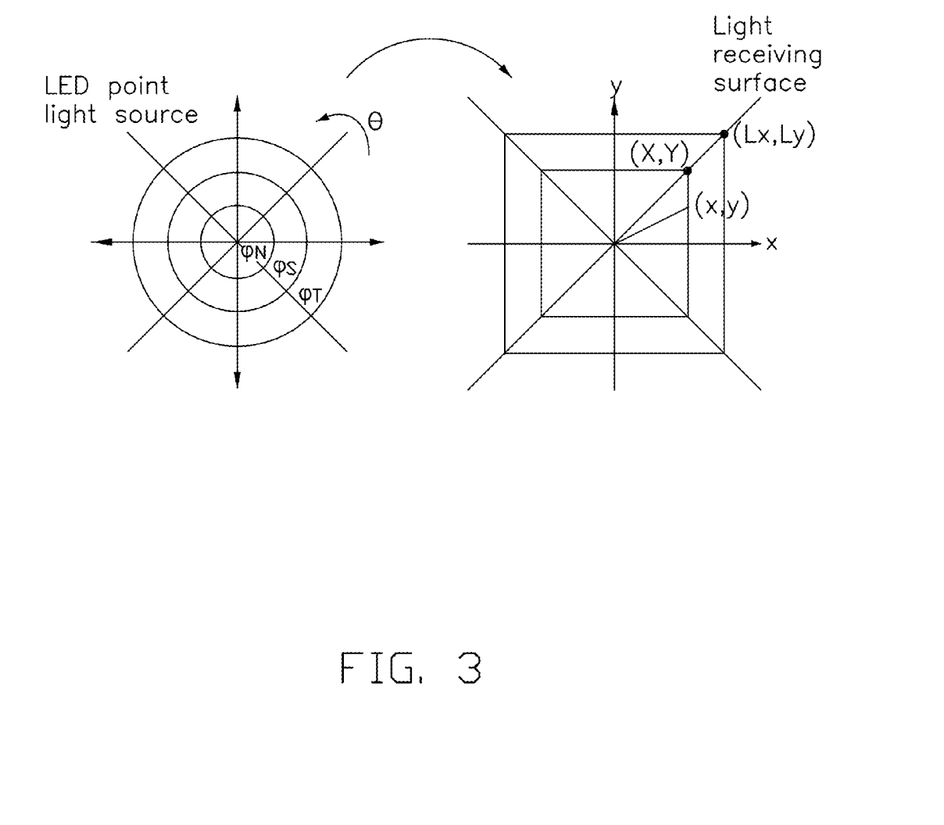
FIG. 3 is a schematic view showing one embodiment of light mapping from a point light source to a light receiving surface in the design method of LED freeform surface illumination system.

Referring to FIG. 3, the length $2L_x$ and the width $2L_y$ of the rectangular light spot are not limited. $L_x$ and $L_y$ are constant values that are predetermined. In one embodiment, the length $2L_x$ is equal to the width $2L_y$ that are both about 20 mm (i.e., $L_x = L_y = 10$ mm).

The mapping relationship is established between the lights emitted from the LED point light source 10 having the light emitting angles in the three regions and the light spots on the light receiving surface 14. In the region of the $0 \le \phi \le \phi_N$, the lights emitted from the center of the LED point light source 10 (i.e., the lights of $\phi = 0°$) are mapped to the center of the rectangular light spot on the light receiving surface 14. The lights of $\phi = \phi_N$ are mapped to the edges of the rectangular light spot on the light receiving surface 14. A half of the length of the rectangular light spot is $L_x$. A half of the width of the rectangular light spot is $L_y$. The $L_x$ and the $L_y$ can satisfy the following equation:

$$\frac{\pi}{2} \int_0^{\varphi_N} I_0 \cos\varphi \sin\varphi \, d\varphi = E \times L_x \times L_y \qquad (2\text{-}1)$$

In the equation (2-1), E represents illuminance.

In the region $0 \le \phi \le \phi_N$, each light of the light emitting angle $\phi$ is mapped to a rectangular frame shaped light spot having a length 2X and a width 2Y on the light receiving surface 14. A half of the length of the rectangular frame shaped light spot is X. A half of the width of the rectangular frame shaped light spot is Y. According to the law of conservation of energy, the X and Y can satisfy the following equation:

$$\frac{\pi}{2} \int_0^{\varphi} I_0 \cos\varphi \sin\varphi \, d\varphi = E \times X \times Y \qquad (2\text{-}2)$$

According to the equation (2-1) and the equation (2-2), the mapping relationship in the region $0 \le \phi \le \phi_N$ of the light emitting angle $\phi$ can be expressed as the following system of equations:

$$\begin{cases} X = L_x \dfrac{\sin\varphi}{\sin\varphi_N} \\ Y = L_y \dfrac{\sin\varphi}{\sin\varphi_N} \end{cases} \qquad (2\text{-}3)$$

Similarly, the mapping relationship in the region $\phi_N \le \phi \le \phi_S$ of the light emitting angle $\phi$ can be expressed as the following system of equations:

$$\begin{cases} X = L_x \sqrt{\dfrac{\sin^2\varphi_S - \sin^2\varphi}{\sin^2\varphi_S - \sin^2\varphi_N}} \\ Y = L_y \sqrt{\dfrac{\sin^2\varphi_S - \sin^2\varphi}{\sin^2\varphi_S - \sin^2\varphi_N}} \end{cases} \qquad (2\text{-}4)$$

Similarly, the mapping relationship in the region $\phi_S \le \phi \le \phi_T$ of the light emitting angle $\phi$ can be expressed as the following system of equations:

$$\begin{cases} X = L_x \sqrt{\dfrac{\sin^2\varphi - \sin^2\varphi_S}{\sin^2\varphi_T - \sin^2\varphi_S}} \\ Y = L_y \sqrt{\dfrac{\sin^2\varphi - \sin^2\varphi_S}{\sin^2\varphi_T - \sin^2\varphi_S}} \end{cases} \qquad (2\text{-}5)$$

According to a equal proportion relationship, a relationship between the any point (x, y) on the light receiving surface 14 and the length and width (2X and 2Y) of the rectangular frame shaped light spot can be expressed as the following system of equations:

$$\begin{cases} 0 \le \theta \le \pi/4 & \begin{cases} x = X \\ y = \dfrac{4\theta}{\pi} Y \end{cases} \\ \pi/4 \le \theta \le \pi/2 & \begin{cases} x = \left(2 - \dfrac{4\theta}{\pi}\right) X \\ y = Y \end{cases} \end{cases} \qquad (2\text{-}6)$$

According to the equations (2-1) to (2-6), the mapping relationship in the region $0 \le \phi \le \phi_T$ of the light emitting angle $\phi$ can be expressed as the following system of equations:

$$\begin{cases} X, Y = \begin{cases} L_x, L_y \dfrac{\sin\varphi}{\sin\varphi_N} & 0 \le \varphi \le \varphi_N \\ L_x, L_y \sqrt{\dfrac{\sin^2\varphi_S - \sin^2\varphi}{\sin^2\varphi_S - \sin^2\varphi_N}} & \varphi_N \le \varphi \le \varphi_S \\ L_x, L_y \sqrt{\dfrac{\sin^2\varphi - \sin^2\varphi_S}{\sin^2\varphi_T - \sin^2\varphi_S}} & \varphi_S \le \varphi \le \varphi_T \end{cases} \\ \begin{cases} x = X \\ y = \dfrac{4\theta}{\pi} Y \end{cases} \quad 0 \le \theta \le \pi/4 \\ \begin{cases} x = \left(2 - \dfrac{4\theta}{\pi}\right) X \\ y = Y \end{cases} \quad \pi/4 \le \theta \le \pi/2 \end{cases} \quad (2\text{-}7)$$

Figure 4:
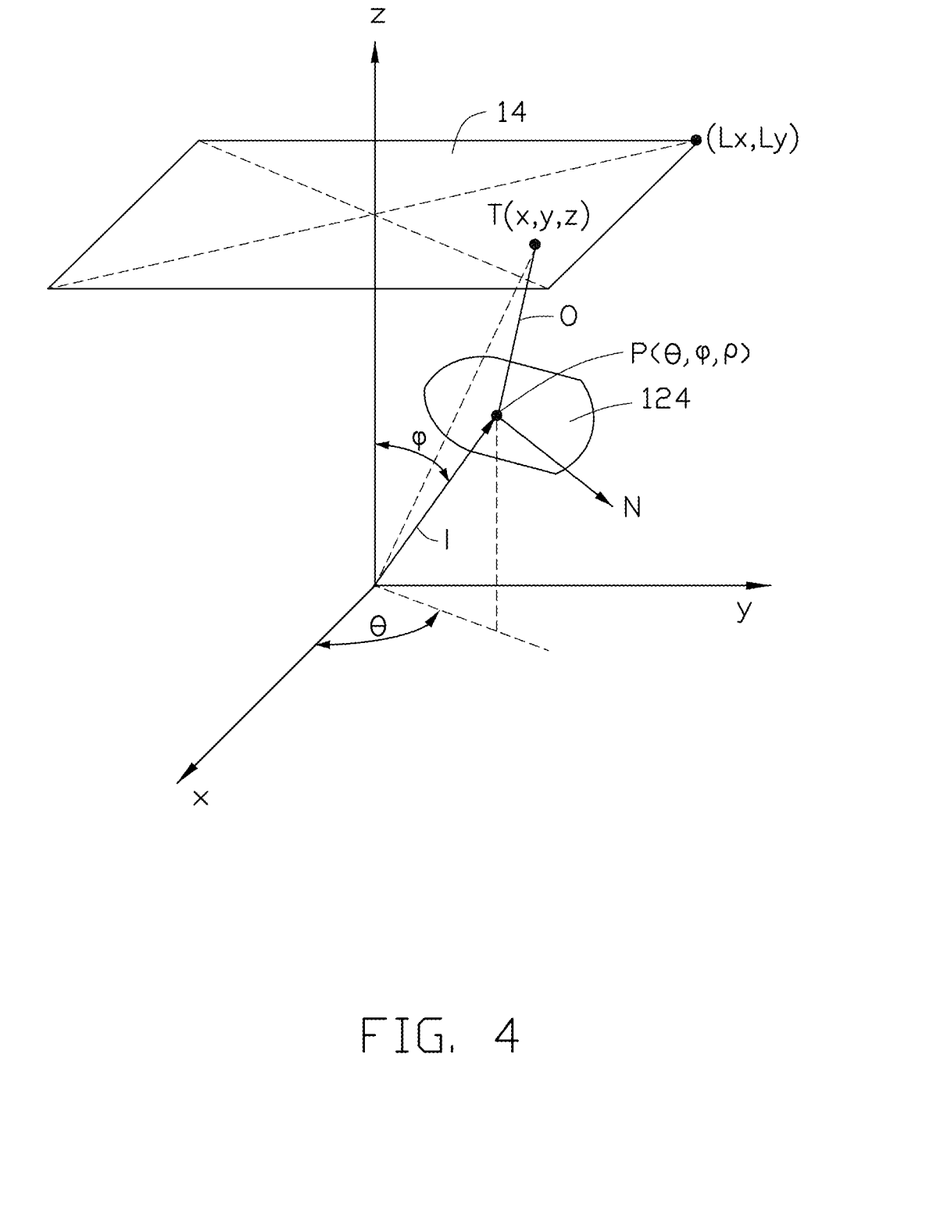
FIG. 4 is a schematic view showing one embodiment of a light redistribution design for LED point light source in the design method of LED freeform surface illumination system.

At block 103, to achieve a uniform rectangular light spot on the light receiving surface 14, the light redistribution design is performed for redistributing the lights emitted from the LED point light source 10. Referring to FIG. 4, a spherical coordinate system can be defined as $(\theta, \varphi, \rho)$. In the spherical coordinate system, $\rho$ is the radial distance between a point and the LED point light source 10, $\theta$ is the azimuthal angle, and the light emitting angle $\varphi$ is the polar angle. I represents incident light. A vector I can be expressed as the following equation:

$$I = (\sin\varphi\cos\theta, \sin\varphi\sin\theta, \cos\varphi) \quad (3\text{-}1)$$

P represents any point on the freeform surface 124. A vector P can be expressed as the following equation:

$$P = \rho \times I = (\rho\sin\varphi\cos\theta, \rho\sin\varphi\sin\theta, \rho\cos\varphi) \quad (3\text{-}2)$$

O represents an emitting light. A vector O can be expressed as the following equation:

$$O = (T-P)/|T-P| \quad (3\text{-}3)$$

In the equation (3-3), $T = (x, y, z)$.

A normal vector N can be expressed as the following equation:

$$N = P_\theta \otimes P_\varphi / |P_\theta \otimes P_\varphi| = (N_x, N_y, N_z) \quad (3\text{-}4)$$

According to the equations (3-1) to (3-4), the normal vector N can be expressed as the following system of equations:

$$\begin{cases} N_x = \dfrac{-\rho_\theta \times \sin\theta + \rho_\varphi \times \sin\varphi \times \cos\varphi \times \cos\theta - \rho \times \sin^2\varphi\cos\theta}{(\rho_\theta^2 + \rho_\varphi^2 \sin^2\varphi + \rho^2 \sin^2\varphi)^{1/2}} \\ N_y = \dfrac{\rho_\theta \times \cos\theta + \rho_\varphi \times \sin\varphi \times \cos\varphi \times \sin\theta - \rho \times \sin^2\varphi \times \sin\theta}{(\rho_\theta^2 + \rho_\varphi^2 \sin^2\varphi + \rho^2 \sin^2\varphi)^{1/2}} \\ N_z = \dfrac{-\rho_\varphi \times \sin^2\varphi - \rho \times \sin\varphi \times \cos\varphi}{(\rho_\theta^2 + \rho_\varphi^2 \sin^2\varphi + \rho^2 \sin^2\varphi)^{1/2}} \end{cases} \quad (3\text{-}5)$$

The vector I, the vector O and the vector N follow the Snell's law, that is satisfying the following equation:

$$n_o \times O - n_I \times I = [n_o^2 + n_I^2 - 2 \times n_o \times n_I \times (O \cdot I)]^{1/2} \times N \quad (3\text{-}6)$$

In the equation (3-6), the $n_o$ represents a refractive index of air, the $n_I$ represents a refractive index of a freeform surface lens 12.

The system of first order partial differential equations of the freeform surface 124 can be expressed as:

$$\begin{cases} \rho_\varphi = \rho(\theta, \varphi) \times \dfrac{\sin\varphi \times (n_0 \times O_z - n_I \times I_z) - \cos\varphi \times A}{\cos\varphi \times (n_0 \times O_z - n_I \times I_z) + \sin\varphi \times A} \\ \rho_\theta = \rho(\theta, \varphi) \times \sin\varphi \times \dfrac{\sin\theta \times (n_0 \times O_x - n_I \times I_x) - \cos\theta \times (n_0 \times O_y - n_I \times I_y)}{\cos\varphi \times (n_0 \times O_z - n_I \times I_z) + \sin\varphi \times A} \\ A = \sin\theta \times (n_0 \times O_y - n_I \times I_y) + \cos\theta \times (n_0 \times O_x - n_I \times I_x) \end{cases} \quad (3\text{-}7)$$

At block 104, the system of first order quasi-linear partial differential equations of the freeform surface 124 can be obtained by substituting the equation (2-7) into the equation (3-7). The system of first order quasi-linear partial differential equations can be simplified and solved by using the Runge-Kutta method and Lax difference scheme. A plurality of freeform surface data of the freeform surface 124 can be obtained by using MATLAB programming according to the system of first order quasi-linear partial differential equations.

Figure 5:
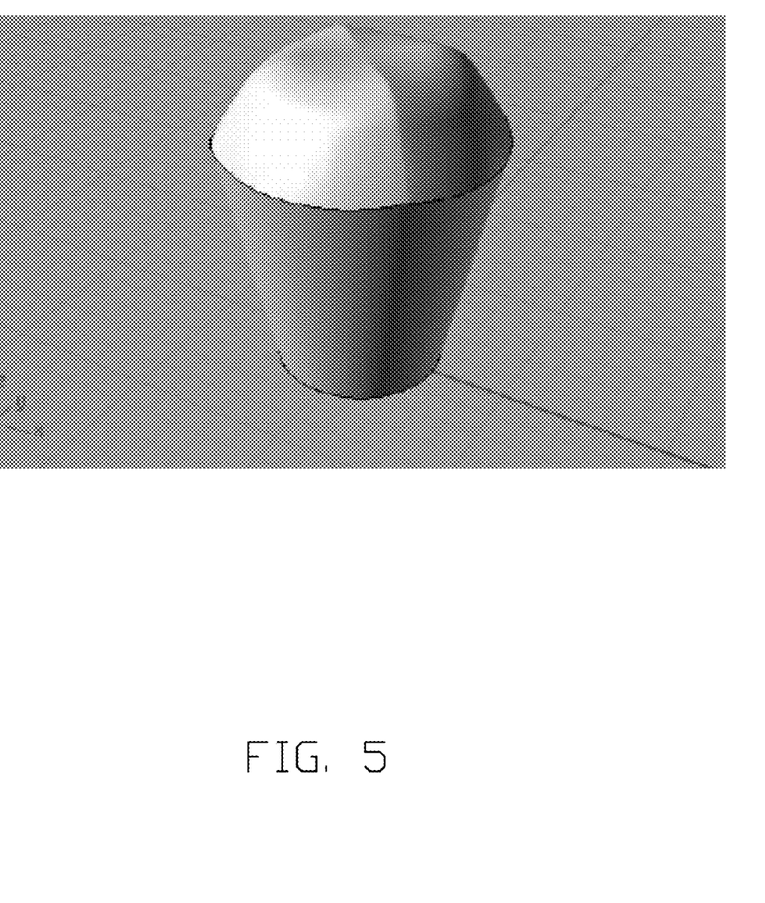
FIG. 5 is a three dimensional image of one embodiment of a freeform surface lens obtained by the design method of LED freeform surface illumination system.

At block 105, the freeform surface 124 can be obtained by surface fitting the plurality of freeform surface data. The surface fitting can be realized by using non uniform rational B-spline (NURBS). Referring to FIG. 5, in one embodiment, the surface fitting can be realized by using a rhinoceros modeling software based on a principle of the NURBS to obtain a lens comprising the freeform surface 124.

Figure 6:
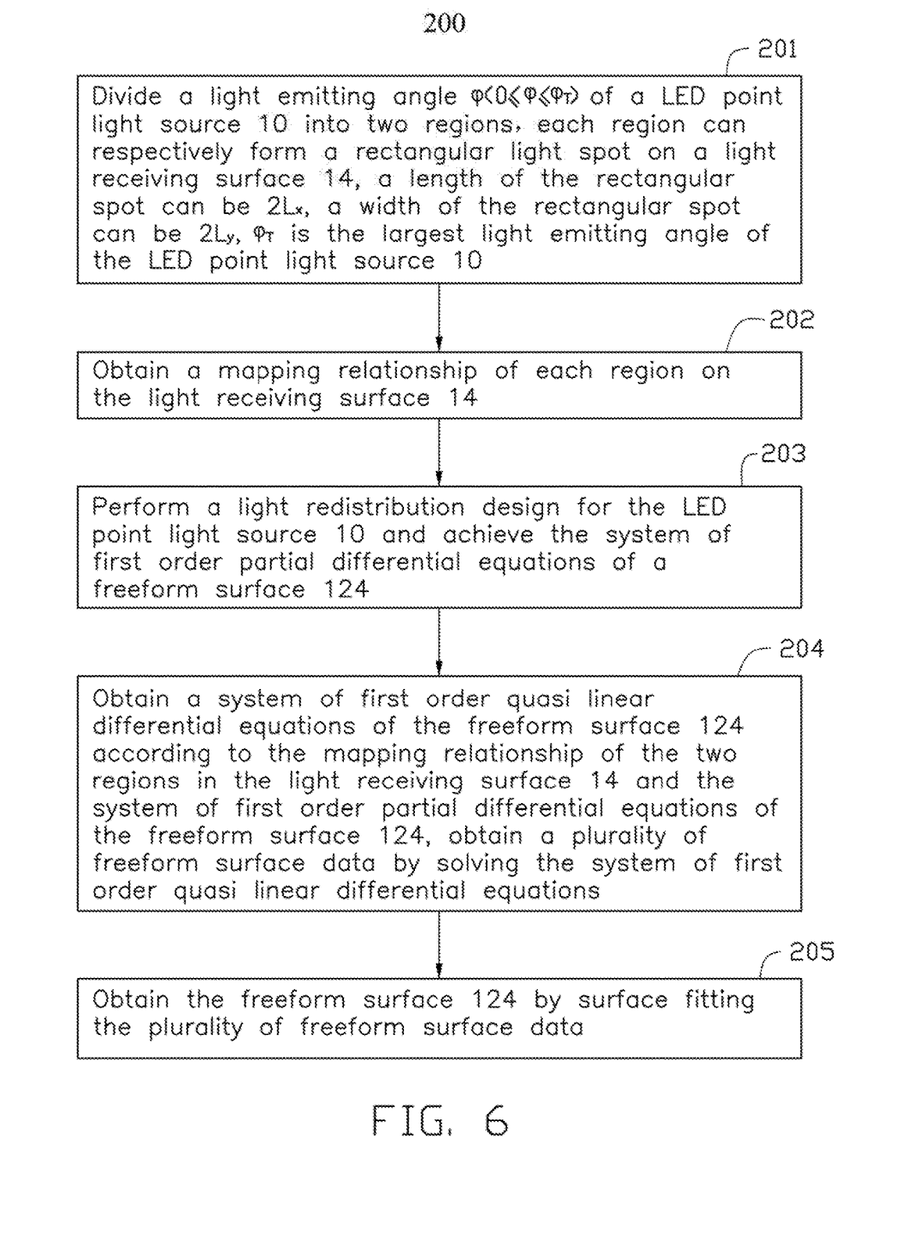
FIG. 6 is flowchart of another embodiment of the design method of LED freeform surface illumination system.

In the design method of LED freeform surface illumination system 100, the light emitting angle $\varphi$ of the LED point light source 10 is not limited to be divided into three regions. The light emitting angle $\varphi$ of the LED point light source 10 can be divided into at least two regions. Referring to FIG. 6, a flowchart is presented in accordance with an example embodiment as illustrated. The embodiment of the design method of LED freeform surface illumination system 200 is provided At block 201, a light emitting angle $\varphi$ ($0 \le \varphi \le \varphi_T$) of a LED point light source 10 is divided into two regions. Each region can respectively form a rectangular light spot on a light receiving surface 14. A length of the rectangular spot can be $2L_x$. A width of the rectangular spot can be $2L_y$. A light emitting angle $\varphi_T$ is the largest light emitting angle of the LED point light source 10.

At block 202, a mapping relationship of each region on the light receiving surface 14 is obtained.

At block 203, a light redistribution design for the LED point light source 10 is performed and the system of first order partial differential equations of a freeform surface 124 is achieved.

At block 204, a system of first order quasi linear differential equations of the freeform surface 124 is obtained according to the mapping relationship of the two regions in the light receiving surface 14 and the system of first order partial differential equations of the freeform surface 124. A plurality of freeform surface data is obtained by solving the system of first order quasi linear differential equations.

At block 205, the freeform surface 124 is obtained by surface fitting the plurality of freeform surface data.

Figure 7:
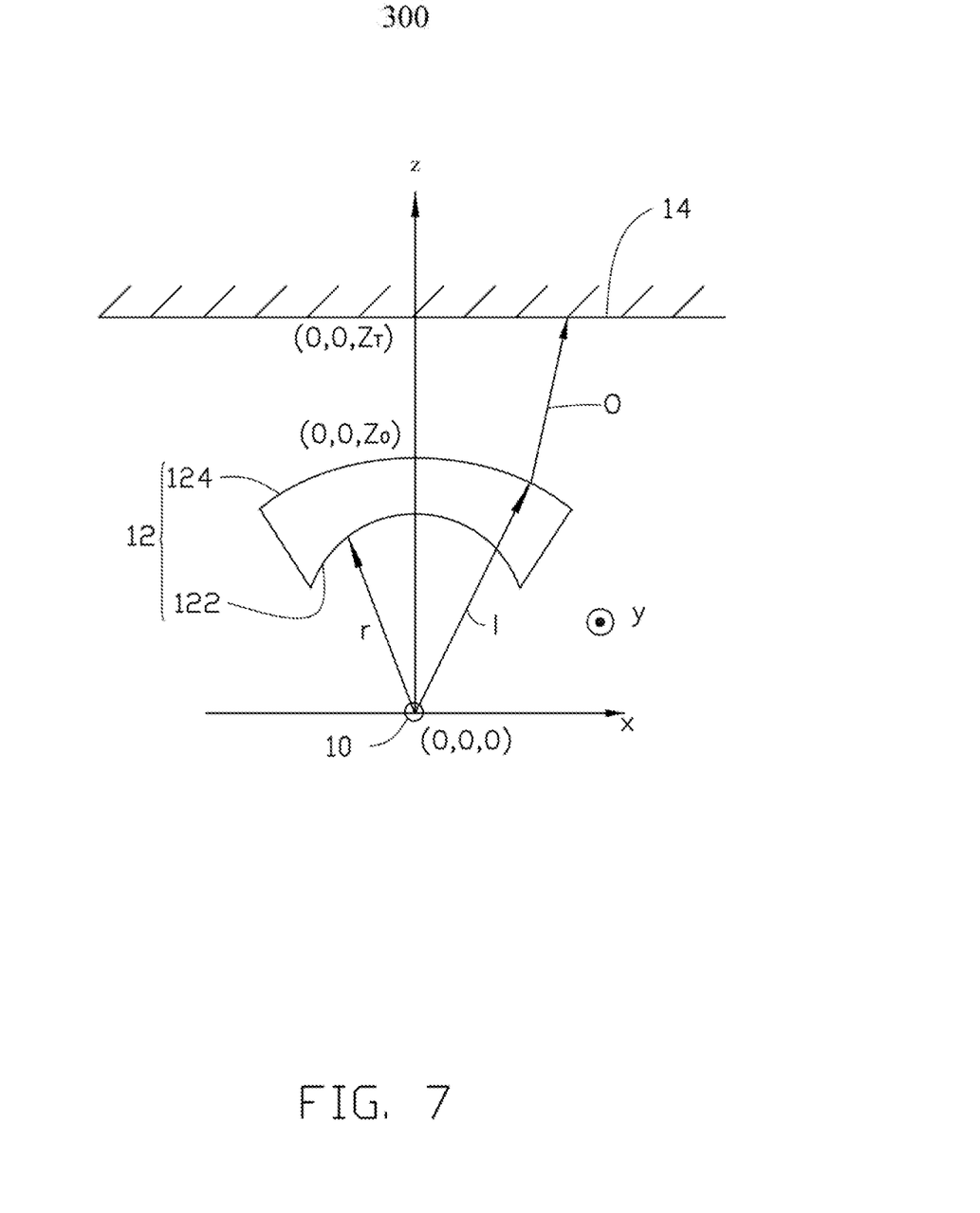
FIG. 7 is a schematic view showing a structure and light paths of one embodiment of the LED freeform surface illumination system.

Referring to FIG. 7, in one embodiment, a LED freeform surface illumination system 300 based on the above described design method is provided. The LED freeform surface illumination system 300 comprises a LED point light source 10, a freeform surface lens 12, and a light receiving surface 14.

The space the LED freeform surface illumination system 300 located in, are defined by a three-dimensional Cartesian coordinate system (x, y, z) and a spherical coordinate system ($\theta$, $\varphi$, $\rho$). The origin of the three-dimensional Cartesian coordinate system (x, y, z) and the origin of the spherical coordinate system (θ, φ, ρ) are at the same point.

The LED point light source 10 is located at the origin (0, 0, 0) of the three-dimensional Cartesian coordinate system (x, y, z). The LED point light source 10 has a largest light emitting angle $\phi_T$. In one embodiment, the largest light emitting angle $\phi_T$ is 30°. The lights having the light emitting angle φ of 0° of the LED point light source 10 are along the z-axis of the three-dimensional Cartesian coordinate system (x, y, z). A diameter of the LED point light source 10 can be about 1 mm to about 5 mm. The light emitting angle φ ($0 \leq \phi \leq \phi_T$) of the light emitted from the LED point light source 10 can be divided into three regions such as three equal regions, three equal proportional regions, or three arbitrary regions. Specifically, the three regions are $0 \leq \phi \leq \phi_N$, $\phi_N \leq \phi \leq \phi_S$, and $\phi_S \leq \phi \leq \phi_T$. In one embodiment, the light emitting angle φ ($0 \leq \phi \leq \phi_T$) of the light emitted from the LED point light source 10 is divided into three equal regions, (e.g., $\phi_N=10°$, $\phi_S=20°$, and $\phi_T=30°$).

The axis of the freeform surface lens 12 is along the z axis of the three-dimensional Cartesian coordinate system (x, y, z). The freeform surface lens 12 comprises a spherical surface 122 and the freeform surface 124 opposite to the spherical surface 122. The spherical surface 122 is a light incident surface. The freeform surface 124 is a light emitting surface.

A spherical centre of the spherical surface 122 is at the origin (0, 0, 0). Thus, the incident lights I will not be refracted when passing the spherical surface 122. The radius of the spherical surface 122 is not limited.

The freeform surface 124 comprises three annular regions. Each region of the light emitting angle φ of the LED point light source 10 corresponds with one annular region of the freeform surface 124. The lights of each region of the light emitting angle φ of the LED point light source 10 can pass the corresponding annular region of the freeform surface 124, to form one rectangular light spot on the light receiving surface 14. The length of the rectangular light spot can be $2L_x$. The width of the rectangular light spot can be $2L_y$. The system of first order partial differential equations of the freeform surface 124 in the spherical coordinate system (θ, φ, ρ) can be expressed as the following equations:

$$\begin{cases} \rho_\varphi = \rho(\theta, \varphi) \times \dfrac{\sin\varphi \times (n_0 \times O_z - n_I \times I_z) - \cos\varphi \times A}{\cos\varphi \times (n_0 \times O_z - n_I \times I_z) + \sin\varphi \times A} \\ \rho_\theta = \rho(\theta, \varphi) \times \sin\varphi \times \dfrac{\sin\theta \times (n_0 \times O_x - n_I \times I_x) - \cos\theta \times (n_0 \times O_y - n_I \times I_y)}{\cos\varphi \times (n_0 \times O_z - n_I \times I_z) + \sin\varphi \times A} \end{cases};$$

wherein $A = \sin\theta \times (n_0 \times O_y - n_I \times I_y) + \cos\theta \times (n_0 \times O_x - n_I \times I_x)$ $O_x = \dfrac{x - \rho\sin\varphi\cos\theta}{\sqrt{(x - \rho\sin\varphi\cos\theta)^2 + (y - \rho\sin\varphi\cos\theta)^2 + (z_o - \rho\cos\varphi)^2}}$ $O_y = \dfrac{y - \rho\sin\varphi\cos\theta}{\sqrt{(x - \rho\sin\varphi\cos\theta)^2 + (y - \rho\sin\varphi\cos\theta)^2 + (z_o - \rho\cos\varphi)^2}}$ $O_z = \dfrac{z_o - \rho\cos\varphi}{\sqrt{(x - \rho\sin\varphi\cos\theta)^2 + (y - \rho\sin\varphi\cos\theta)^2 + (z_o - \rho\cos\varphi)^2}}$ $I = (I_x, I_y, I_z) = (\sin\varphi\cos\theta, \sin\varphi\sin\theta, \cos\varphi)$ The $n_o$ represents the refractive index of air. The m represents the refractive index of a freeform surface lens 12. A coordinate of an intersection between the freeform surface 124 and z axis is (0, 0, $z_0$). In one embodiment, $z_0=10$ mm. That is the distance between the intersection and the origin is 10 mm.

The light receiving surface 14 is located on a side of the freeform surface 124, and parallel to a plane defined by x axis and y axis. A coordinate of an intersection between the light receiving surface 14 and z axis is (0, 0, $z_T$). A value of $z_T$ relates to a size of the rectangular light spot on the light receiving surface 14. In one embodiment, $z_T=50$ mm.

In the LED freeform surface illumination system 300, the LED point light source 10 and the freeform surface lens 12 are both not limited to be divided into three regions. The light emitting angle φ of the LED point light source 10 can be divided into at least two regions. The freeform surface 124 can be divided into at least two annular regions. Each annular region of the freeform surface 124 is corresponding with one region of the light emitting angle φ of the LED point light source 10. In one embodiment, the light emitting angle φ of the LED point light source 10 is divided into two regions. The freeform surface 124 is divided into two annular regions. Each region of the light emitting angle φ is corresponding with one annular region of the freeform surface 124. The lights of one region of the light emitting angle φ pass the corresponded annular region of the freeform surface 124, to form one rectangular light spot on the light receiving surface 14. The length of the rectangular light spot can be $2L_x$, the width of the rectangular light spot can be $2L_y$.

Figure 8:
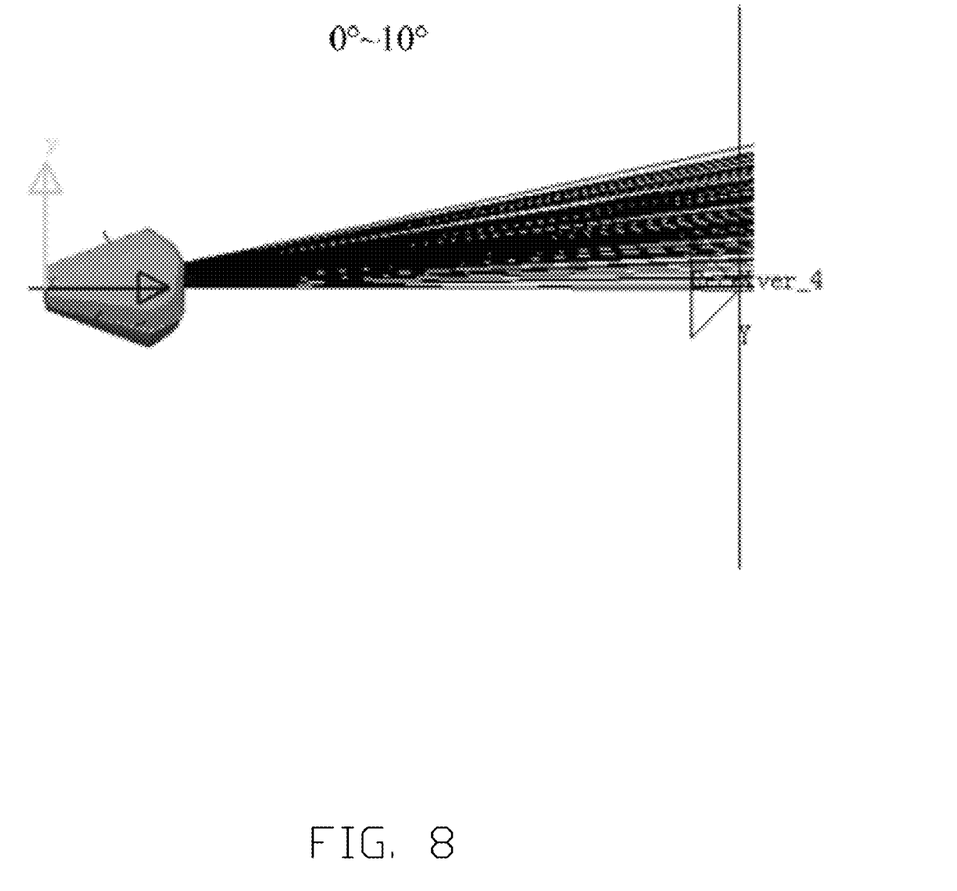
FIG. 8 is a LightTools light simulation image of one embodiment of the freeform surface lens with light emitting angles in a region of 0°-10°.
Figure 9:
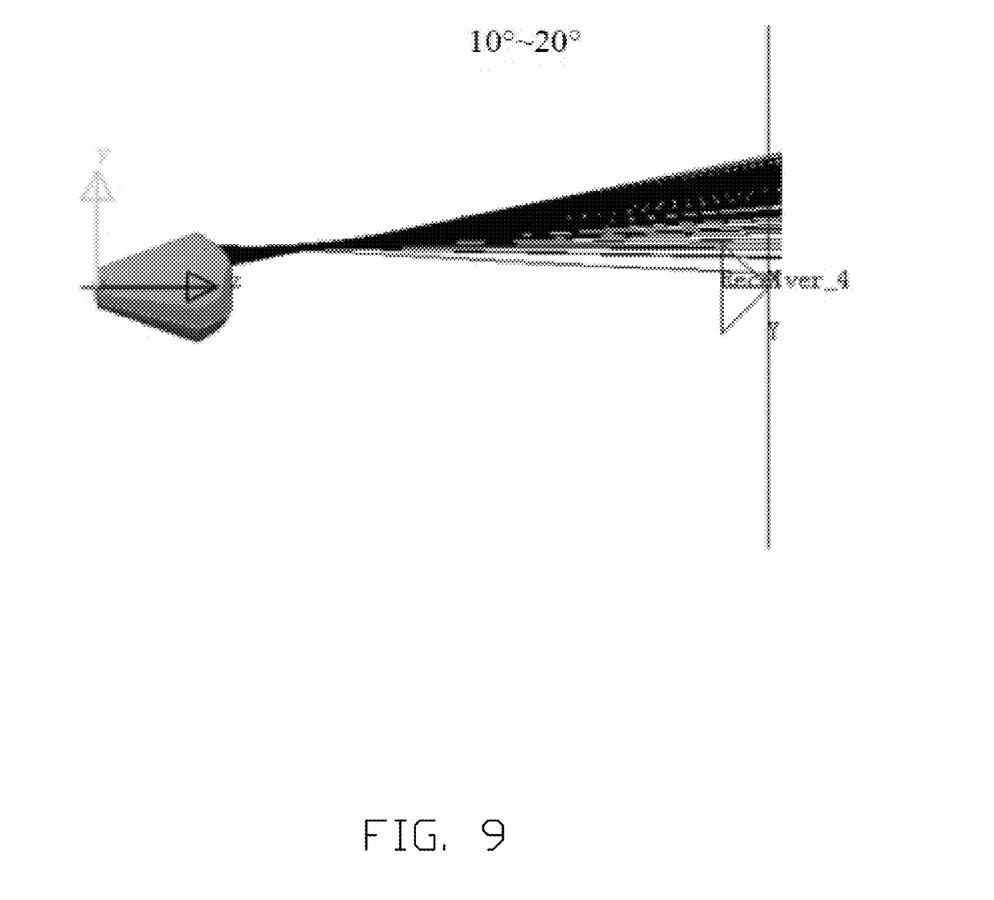
FIG. 9 is a LightTools light simulation image of the freeform surface lens with emitting angles in a region of 10°-20°.
Figure 10:
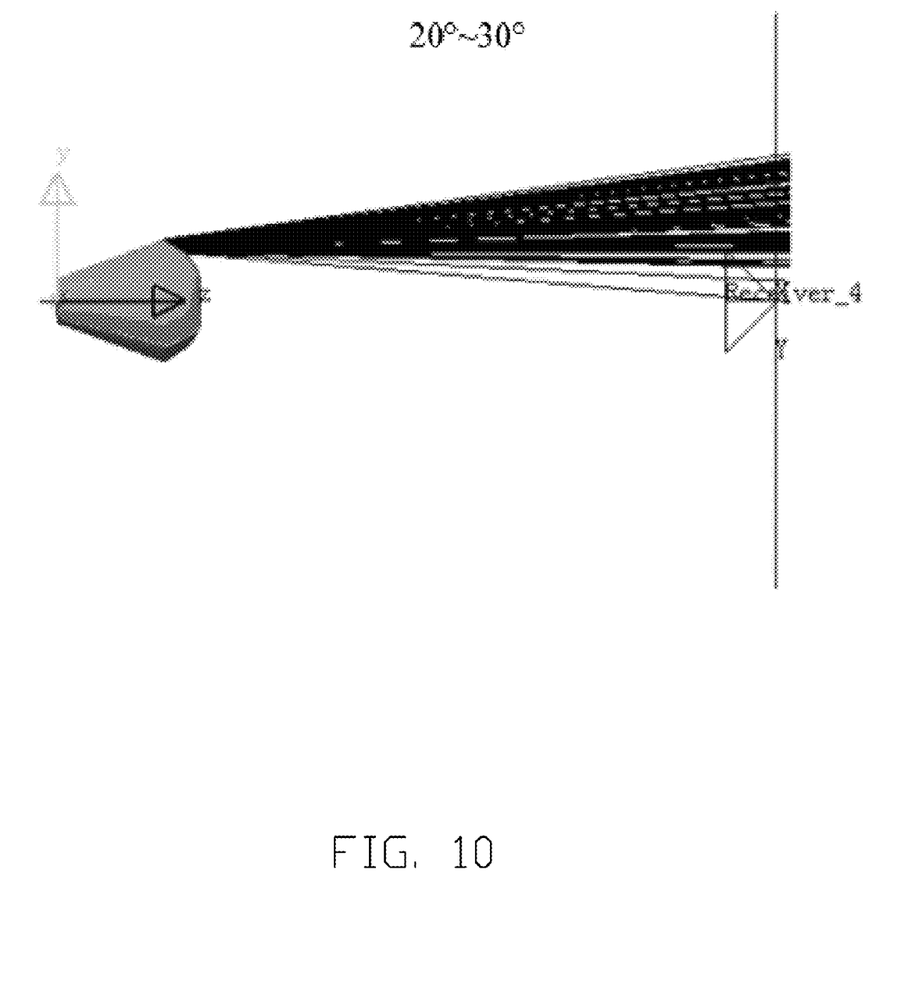
FIG. 10 is a LightTools light simulation image of the freeform surface lens with emitting angles in a region of 20°-30°.

Referring to FIG. 8 to FIG. 10, light simulation results of the three annular regions of the freeform surface 124 are obtained by LIGHTTOOLS software. Referring to FIG. 6, when the light emitting angle φ is in a region of 0° to 10°, the lights having the light emitting angle φ of 0° pass the freeform surface 124 to illuminate the center of the rectangular light spot, and the lights having the light emitting angle φ of 10° pass the freeform surface 124 to illuminate the edges of the rectangular light spot. Referring to FIG. 7, to keep the freeform surface 124 continuous, when the light emitting angle φ is in a region of 10° to 20°, the lights having the light emitting angle φ of 10° pass the freeform surface 124 to illuminate the edges of the rectangular spot, and the lights having the light emitting angle φ of 20° pass the freeform surface 124 to illuminate the center of the rectangular light spot. Referring to FIG. 8, to keep the freeform surface 124 continuous, when the light emitting angle φ is in a region of 20° to 30°, the lights having the light emitting angle φ of 20° pass the freeform surface 124 to illuminate the center of the rectangular light spot, and the lights having the light emitting angle φ of 30° pass the freeform surface 124 to illuminate the edges of the rectangular light spot.

Figure 11:
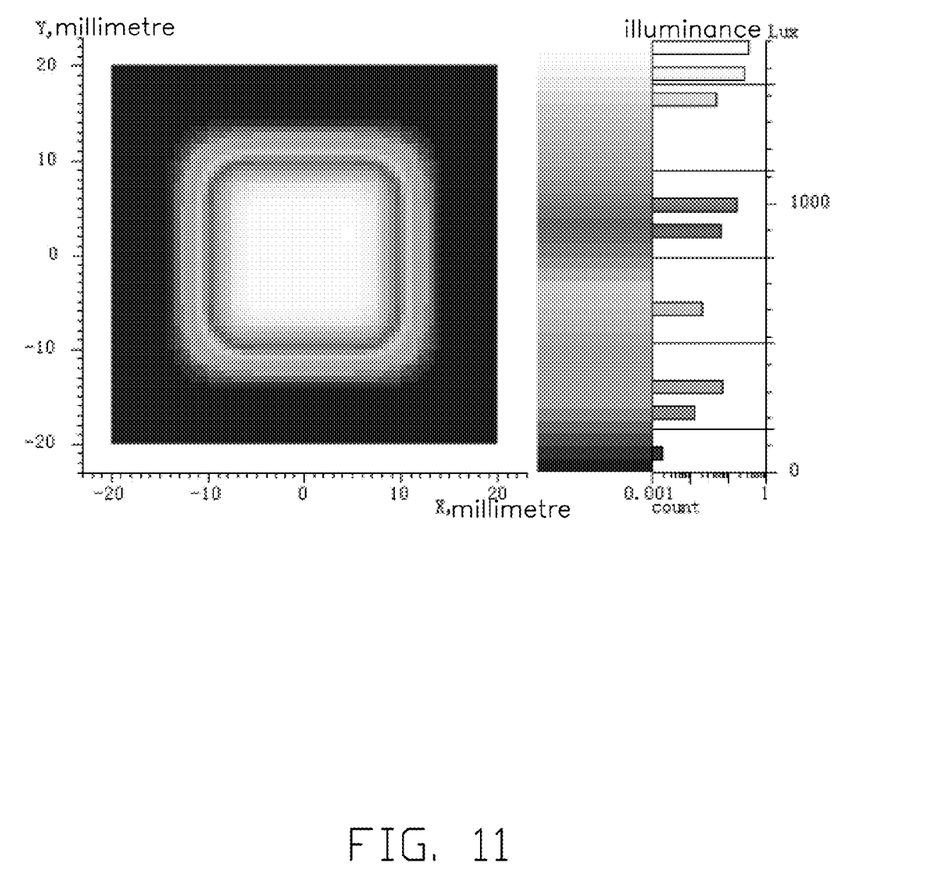
FIG. 11 is a diagram showing a software-simulated square light spot and an illuminance distribution thereof.
Figure 12:
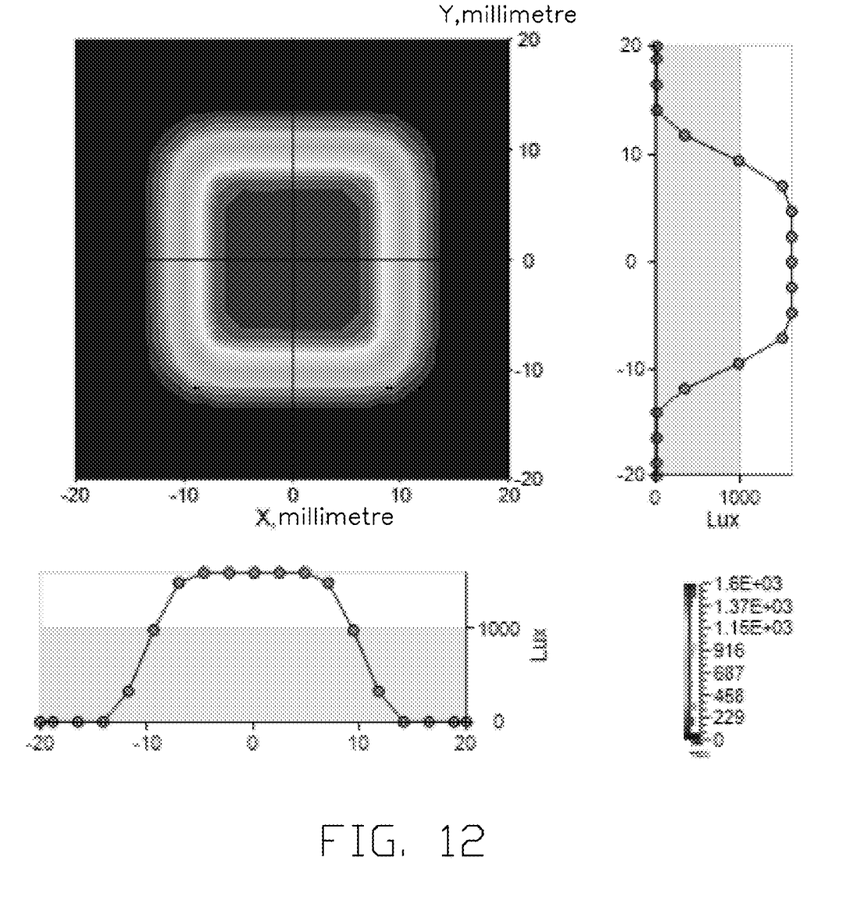
FIG. 12 is a diagram showing another software-simulated square light spot and illuminance distributions on X axis and Y axis thereof.

Referring to FIG. 11 and FIG. 12, in one embodiment, an energy utilization efficiency of the LED freeform surface illumination system 300 is about 97.2%. An illuminating uniformity of the LED freeform surface illumination system 300 is about 84.3%. The more the annular regions of the freeform surface 124 have, the illuminating uniformity of the freeform surface applied to the LED freeform surface illumination system 300 can be improved If the lights emitted from the LED point light source 10 directly reach the light receiving surface 14, a non-uniform light spot would be formed on the light receiving surface 14. In the present method, a freeform surface lens 12 having the freeform surface 124 is arranged between the LED point light source 10 and the light receiving surface 14 to form a uniform rectangular light spot on the light receiving surface 14. The design method of LED freeform surface illumination system and the LED freeform surface illumination system 300 have the following advantages. The freeform surface 124 is divided into at least two annular regions. The light emitting angle of the LED point light source 10 is divided into at least two regions. Each region of the light emitting angle of the LED point light source 10 is corresponded with one annular region of the freeform surface 124. The lights of all the regions pass the corresponding annular regions of the freeform surface 124, to form the same rectangular light spots on a light receiving surface 14. The rectangular light spots formed from the lights of different regions are formed on the same place on the light receiving surface 14. Thus, in the LED freeform surface illumination system, a uniform illumination can be realized on the light receiving surface 14.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A design method of forming a freeform surface of a freeform surface lens for an LED freeform surface illumination system comprising:
   S1, dividing a light emitting angle $\phi$ of a LED point light source into three regions, wherein the light emitting angle $\phi$ comprises a first light emitting angle $\phi_N$, a second light emitting angle $\phi_S$, a third light emitting angle $\phi_T$, $\phi$ satisfies $0 \leq \phi \leq \phi_T$, the three regions are $0 \leq \phi \leq \phi_N$, $\phi_N \leq \phi \leq \phi_S$, and $\phi_S \leq \phi \leq \phi_T$, each of the three regions forms a rectangular light spot on a light receiving surface, a length of the rectangular light spot is $2L_x$, a width of the rectangular light spot is $2L_y$, and the third light emitting angle $\phi_T$ is a largest light emitting angle of the LED point light source;
   S2, obtaining a mapping relationship of each of the three regions on the light receiving surface;
   S3, performing a light redistribution design for the LED point light source and achieving a system of first order partial differential equations of a freeform surface,
   S4, obtaining a system of first order quasi linear differential equations of the freeform surface according to mapping relationships of the three regions on the light receiving surface and the system of first order partial differential equations of the freeform surface, obtaining a plurality of freeform surface data by solving the system of first order quasi linear differential equations;
   S5, obtaining the freeform surface by surface fitting the plurality of freeform surface data; and
   S6, arranging the freeform surface lens having the freeform surface obtained by the surface fitting the plurality of the freeform surface data.

2. The design method of claim 1, wherein the light emitting angle $\phi$ of the LED point light source is divided into three equal regions, three equal proportional regions, or three arbitrary regions.

3. The design method of claim 1, wherein the largest light emitting angle is 30°.

4. The design method of claim 1, wherein the first light emitting angle $\phi_N=10°$, the second light emitting angle $\phi_S=20°$, and the third light emitting angle $\phi_T=30°$.

5. The design method of claim 1, wherein in $0 \leq \phi \leq \phi_N$, lights of $\phi=0°$ pass the freeform surface to reach a center of the rectangular light spot, and lights of $\phi=\phi_N$ pass the freeform surface to reach edges of the rectangular light spot.

6. The design method of claim 1, wherein in $\phi_N \leq \phi \leq \phi_S$, lights of $\phi=\phi_N$ pass the freeform surface to reach edges of the rectangular light spot, lights of $\phi=\phi_S$ pass the freeform surface to reach a center of the rectangular light spot.

7. The design method of claim 1, wherein in $\phi_S \leq \phi \leq \phi_T$, lights of $\phi=\phi_S$ pass the freeform surface to reach a center of the rectangular light spot, lights of $\phi=\phi_T$ pass the freeform surface to reach edges of the rectangular light spot.

8. The design method of claim 1, wherein each light having the light emitting angle $\phi$ is mapped to a rectangular frame shaped light spot having a length 2X and a width 2Y on the light receiving surface.

9. The design method of claim 8, wherein the mapping relationship in $0 \leq \phi \leq \phi_N$ is expressed as $$\begin{cases} X = L_x \dfrac{\sin\varphi}{\sin\varphi_N} \\ Y = L_y \dfrac{\sin\varphi}{\sin\varphi_N} \end{cases},$$

wherein X represents a half of the length of the rectangular frame shaped light spot, Y represents a half of the width of the rectangular frame shaped light spot, $L_x$ represents a half of the length of the rectangular light spot, and $L_y$ represents a half of the width of the rectangular light spot.

10. The design method of claim 8, wherein the mapping relationship in $\phi_N \leq \phi \leq \phi_S$ is expressed as $$\begin{cases} X = L_x \sqrt{\dfrac{\sin^2\varphi_S - \sin^2\varphi}{\sin^2\varphi_S - \sin^2\varphi_N}} \\ Y = L_y \sqrt{\dfrac{\sin^2\varphi_S - \sin^2\varphi}{\sin^2\varphi_S - \sin^2\varphi_N}} \end{cases},$$

wherein X represents a half of the length of the rectangular frame shaped light spot, Y represents a half of the width of the rectangular frame shaped light spot, $L_x$ represents a half of the length of the rectangular light spot, and $L_y$ represents a half of the width of the rectangular light spot.

11. The design method of claim 8, wherein the mapping relationship in $\phi_S \leq \phi \leq \phi_T$ is expressed as $$\begin{cases} X = L_x \sqrt{\dfrac{\sin^2\varphi - \sin^2\varphi_S}{\sin^2\varphi_T - \sin^2\varphi_S}} \\ Y = L_y \sqrt{\dfrac{\sin^2\varphi - \sin^2\varphi_S}{\sin^2\varphi_T - \sin^2\varphi_S}} \end{cases},$$

wherein X represents a half of the length of the rectangular frame shaped light spot, Y represents a half of the width of the rectangular frame shaped light spot, $L_x$ represents a half of the length of the rectangular light spot, and $L_y$ represents a half of the width of the rectangular light spot.

12. The design method of claim 8, wherein the mapping relationship in $0 \leq \phi \leq \phi_T$ is expressed as $$X, Y = \begin{cases} L_x, L_y \dfrac{\sin\varphi}{\sin\varphi_N} & 0 \leq \varphi \leq \varphi_N \\ L_x, L_y \sqrt{\dfrac{\sin^2\varphi_S - \sin^2\varphi}{\sin^2\varphi_S - \sin^2\varphi_N}} & \varphi_N \leq \varphi \leq \varphi_S \\ L_x, L_y \sqrt{\dfrac{\sin^2\varphi - \sin^2\varphi_S}{\sin^2\varphi_T - \sin^2\varphi_S}} & \varphi_S \leq \varphi \leq \varphi_T \end{cases},$$

$$\begin{cases} x = X \\ y = \dfrac{4\theta}{\pi}Y \end{cases} \quad 0 \leq \theta \leq \pi/4$$

$$\begin{cases} x = \left(2 - \dfrac{4\theta}{\pi}\right)X \\ y = Y \end{cases} \quad \pi/4 \leq \theta \leq \pi/2$$

wherein x and y represent coordinates of a point on the light receiving surface in a three-dimensional Cartesian coordinate system, X represents a half of the length of the rectangular frame shaped light spot, Y represents a half of the width of the rectangular frame shaped light spot, $L_x$ represents a half of the length of the rectangular light spot, and $L_y$ represents a half of the width of the rectangular light spot.

13. The design method of claim 1, wherein the system of first order partial differential equations of the freeform surface is expressed as t $$\begin{cases} \rho_\varphi = \rho(\theta, \varphi) \times \dfrac{\sin\varphi \times (n_0 \times O_z - n_I \times I_z) - \cos\varphi \times A}{\cos\varphi \times (n_0 \times O_z - n_I \times I_z) + \sin\varphi \times A} \\ \rho_\theta = \rho(\theta, \varphi) \times \sin\varphi \times \dfrac{\sin\theta \times (n_0 \times O_x - n_I \times I_x) - \cos\theta \times (n_0 \times O_y - n_I \times I_y)}{\cos\varphi \times (n_0 \times O_z - n_I \times I_z) + \sin\varphi \times A} \end{cases}$$

wherein, $A = \sin\theta \times (n_0 \times O_y - n_I \times I_y) + \cos\theta \times (n_0 \times O_x - n_I \times I_x);$ $O_x = \dfrac{x - \rho\sin\varphi\cos\theta}{\sqrt{(x - \rho\sin\varphi\cos\theta)^2 + (y - \rho\sin\varphi\cos\theta)^2 + (z_o - \rho\cos\varphi)^2}};$ $O_y = \dfrac{y - \rho\sin\varphi\cos\theta}{\sqrt{(x - \rho\sin\varphi\cos\theta)^2 + (y - \rho\sin\varphi\cos\theta)^2 + (z_o - \rho\cos\varphi)^2}};$ $O_z = \dfrac{z_o - \rho\cos\varphi}{\sqrt{(x - \rho\sin\varphi\cos\theta)^2 + (y - \rho\sin\varphi\cos\theta)^2 + (z_o - \rho\cos\varphi)^2}};$ and $I = (I_x, I_y, I_z) = (\sin\varphi\cos\theta, \sin\varphi\sin\theta, \cos\varphi);$ $n_o$ represents a refractive index of air, $n_I$ represents a refractive index of a freeform surface lens, and a coordinate of an intersection between the freeform surface and z axis is $(0, 0, z_0)$.

14. A design method of forming a freeform surface of a freeform surface lens for an LED freeform surface illumination system comprising:

S1, dividing a light emitting angle $\phi$ of a LED point light source into at least two regions, wherein each region of the at least two regions forms a rectangular light spot on a light receiving surface, a length of the rectangular light spot is $2L_x$, a width of the rectangular light spot is $2L_y$;

S2, obtaining a mapping relationship of each region of the at least two regions on the light receiving surface;

S3, performing a light redistribution design for the LED point light source and achieving a system of first order partial differential equations of a freeform surface, S4, obtaining a system of first order quasi linear differential equations of the freeform surface according to mapping relationships of the at least two regions on the light receiving surface and the system of first order partial differential equations of the freeform surface, obtaining a plurality of freeform surface data by solving the system of first order quasi linear differential equations;

S5, obtaining the freeform surface by surface fitting the plurality of freeform surface data; and S6, arranging the freeform surface lens having the freeform surface obtained by the surface fitting the plurality of the freeform surface data.

* * * * *

UNITED STATES PATENT AND TRADEMARK OFFICE
CERTIFICATE OF CORRECTION

PATENT NO. : 9,858,362 B2  
APPLICATION NO. : 14/604353  
DATED : January 2, 2018  
INVENTOR(S) : Si-Si Xiong et al.

Page 1 of 1

It is certified that error appears in the above-identified patent and that said Letters Patent is hereby corrected as shown below:

On the Title Page

Please replace Item (54) with the following:  
(54) DESIGN METHOD OF LED FREEFORM SURFACE ILLUMINATION SYSTEM Signed and Sealed this  
Twenty-fifth Day of September, 2018

Andrei Iancu  
*Director of the United States Patent and Trademark Office*